US008725714B2

(12) United States Patent
    Ai

(10) Patent No.: US 8,725,714 B2
(45) Date of Patent: May 13, 2014

(54) PRIVATE INFORMATION REQUESTS AND INFORMATION MANAGEMENT

(76) Inventor: Chuan David Ai, San Francisco, CA (US)

( * ) Notice: Subject to any disclaimer, the term of this patent is extended or adjusted under 35 U.S.C. 154(b) by 182 days.

(21) Appl. No.: 12/737,989

(22) PCT Filed: Sep. 8, 2009

(86) PCT No.: PCT/US2009/005068
§ 371 (c)(1),
(2), (4) Date: Mar. 4, 2011

(87) PCT Pub. No.: WO2010/027517
PCT Pub. Date: Mar. 11, 2010

(65) Prior Publication Data

US 2011/0161176 A1    Jun. 30, 2011

Related U.S. Application Data

(60) Provisional application No. 61/095,142, filed on Sep. 8, 2008.

(51) Int. Cl.
    *G06F 7/00*       (2006.01)
    *G06Q 30/00*    (2012.01)
    *G06F 17/30*    (2006.01)
    *G06Q 30/02*    (2012.01)

(52) U.S. Cl.
    CPC .... *G06F 17/30864* (2013.01); *G06F 17/30569* (2013.01); *G06Q 30/0251* (2013.01)
    USPC .......................... 707/706; 707/757; 705/14.49

(58) Field of Classification Search
    USPC ....................................................... 705/14.54
    See application file for complete search history.

(56) References Cited

U.S. PATENT DOCUMENTS 3,862,716 A * 1/1975 Black et al. .................... 235/381
6,178,432 B1 * 1/2001 Cook et al. ..................... 715/201
(Continued)

FOREIGN PATENT DOCUMENTS

EP         1251436          10/2010
WO       WO 03/036534       5/2003

OTHER PUBLICATIONS

Rescorla et al., "RFC 2660—The Secure HyperText Transfer Protocol", The Internet Society, Aug. 1999, archive maintained by the Internet Engineering Task Force and found on line at ietf.org.*

*Primary Examiner* — John G Weiss
*Assistant Examiner* — Scott C Anderson
(74) *Attorney, Agent, or Firm* — Lumen Patent Firm

(57) ABSTRACT

Information management techniques for performing private information request are provided. Original information request entered on a personal computing device are obscured by a camouflaging engine. The obscured information request is then submitted to a search engine accessible over the Internet by the device. Subsequently, the search engine will generate search results based on the obscured information request. Upon completion of the search, a filtering engine on the device will filter the obscured search result based on the original entered information request, preferences or personal profile. The output of the filtering engine, reflecting the personalized result for the original information request, can be displayed on the device. The device could also include ways to receive advertisements from the search engine, or a third or an outside advertisement party. An advertisement filtering engine on the device filters the received advertisements and displays the filtered advertisements on the device.

6 Claims, 2 Drawing Sheets

(56) References Cited

U.S. PATENT DOCUMENTS

| | | |
|---|---|---|
| 6,230,205 B1 * | 5/2001 | Garrity et al. ............... 709/231 |
| 6,385,611 B1 * | 5/2002 | Cardona ............................ 1/1 |
| 6,983,256 B2 * | 1/2006 | Drummond et al. ........... 705/35 |
| 2002/0174115 A1 | 11/2002 | Shibuya et al. |
| 2008/0005264 A1 | 1/2008 | Brunell et al. |
| 2009/0204580 A1 * | 8/2009 | Seamon et al. ................. 707/3 |
| 2009/0222561 A1 * | 9/2009 | George et al. ................ 709/226 |
| 2011/0035503 A1 * | 2/2011 | Zaid et al. .................... 709/228 |

* cited by examiner

PRIVATE INFORMATION REQUESTS AND INFORMATION MANAGEMENT

CROSS-REFERENCE TO RELATED APPLICATIONS

This application is a 371 of PCT Patent Application PCT/US2009/005068 filed Sep. 8, 2009, which claims the benefit of U.S. Provisional Application 61/095,142 filed Sep. 8, 2008.

FIELD OF THE INVENTION

The present invention relates generally to search engines and information management systems.

BACKGROUND OF THE INVENTION

As consumers, we enjoy retrieving information that fits our unique needs from Internet search queries or advertisers. However, our excitement of these services diminishes when we have to give up control over our private and personal information. Submitting personal and privacy data to any online entity could lead to unwanted advertising, which makes us reluctant to supply personal information to search engines or advertisers in exchange for more customized search results or more useful advertising. Accordingly, there is a need in the art to develop new approaches to information search and management. The current invention addresses this need and focuses on privacy protection and advertising management in an information request and provision cycle such as Internet search. The current invention allows for personal control over privacy information while offering personalized information in search results, as well as targeted adverting between advertisers and consumers.

SUMMARY OF THE INVENTION

The invention provides new ways for performing private information request on a personal computing device which can be embodied as a method, device and system. In addition, the invention can be embodied as a digital storage medium tangibly embodying machine-readable instructions executable by a personal computing device. A system that embodies this invention can be implemented as a virtual personal computing device, physically on an Internet website that allows the user to access and use it from multiple computing and communications devices. In one embodiment, a user of a personal computing device enters an original information request on the personal computing device. The original information request is characterized by containing at least one keyword. These information request are generically defined as search queries, information subscriptions or database queries.

Information queries are a general concept behind any information search, which includes internet search queries, information searches not on the Internet, and information subscription requests. By "information searches not on the Internet" we mean information searches against databases or other lists which could, but does not have to, involve the Internet. For example, searching a movie list maintained in a database for several movies of particular interest to a user. Such a list is likely to be maintained by a single website on the Internet, but it can also be available on several websites, or it can be on a computer server off the Internet (that requires direct connection from the user's device).

By "information subscription requests" we mean both static (traditional, batch mode news feed) and dynamic (real-time streaming mode news feed, such as Real Simple Syndication or RSS). Such information subscription requests often involve clicking on a long list of "are you interested in the following subjects" buttons, to allow the information service provider to tailor the news service to our needs.

All such information queries share the same characteristics that (1) they are a form of information narrowing request, to denote specific information the user is interested in finding; (2) they sometimes contain information that may reveal privacy or other personal data about the user, which would aid the information provider in narrowing the search and providing more accurate search result; (3) such users may wish to keep such privacy or personal data from outside services, to protect his or her privacy. Although the description of the invention pertains mostly to search queries, the examples generally apply to information requests as defined herein.

A camouflaging engine obscures the original information request entered by the user and produces an obscured information request before a search is submitted or performed. An information request submission engine obscures is used to submit the obscured information request to a third party or outside search engine which is accessible over the Internet by the personal computing device. Subsequently, the search engine will generate search results based on the obscured information request. Upon completion of the search, a receiving engine will be capable of receiving the obscured search result from the search engine. A filtering engine will process and filter the obscured search result based on the original entered information request, stored preferences and personal profile of the user of the personal computing device, or a combination thereof. The output of the filtering engine can then be displayed on the personal computing device. The camouflaging engine, submission engine, receiving engine and filtering engine could either all together or in any combination reside on the personal computing device or on a remote computing device.

The original information request (e.g. search query) can be obscured by the camouflaging engine in different ways, either individually or in any combination, all with the objective of changing the original information request to protect a user's personal or privacy information. For example, the original information request could include two or more keywords and the obscured information request could result into a subset of keywords compared to the number of keywords in the original information request. In another example, the original information request could include two or more keywords and the obscured information request could contains fewer keywords compared to the number of keywords in the original information request. In this example, one or more keywords in the obscured information request could be replaced by one or more generalized keywords, one or more less-sensitive keywords, one or more less-specific keywords, one or more less-privacy revealing keywords, one or more related keywords or one or more alternate keywords compared to the original keywords in the original information request. In still another example, the original information request could include two or more keywords and one or more keywords in the original information request could be removed. In still another example, the original information request could include two or more keywords and one or more keywords in the original information request could be removed as a result of searching and selecting one or more keywords from a defined list of keywords. In yet another example, the original information request comprises two or more keywords and one or more keywords are removed or changed according to stored preferences and personal profile of the user of the personal computing device. An important aspect of the invention is that the camouflaging engine does not encrypt the original information request. In other words, the original information request and obscured information request are both a list of one or more keywords, yet with the differences as described herein.

In another embodiment of the invention, the personal or remote computing device could also include ways to receive one or more advertisements from the search engine or receive one or more advertisements from a third advertisement party or an outside advertisement party. The receiving engine is then also capable of receiving one or more advertisements. An advertisement filtering engine on the personal computing device or remote computing device could then filter the received advertisements. The filtering of the advertisements can be performed based on the original information request, stored preferences and personal profile of the user of the personal computing device or remote computing device, or any combination thereof. The filtered result can then be displayed as filtered advertisements on the personal computing device.

The current invention could further include an interface for allowing the user to delete one or more advertisements from the current or any future display. The deleted advertisements or information related to the deleted advertisements can be listed and stored in the preferences and personal profile of the user so that they can be used for future filtering by the filtering engine or editing by the user.

DETAILED DESCRIPTION

Figure 1:
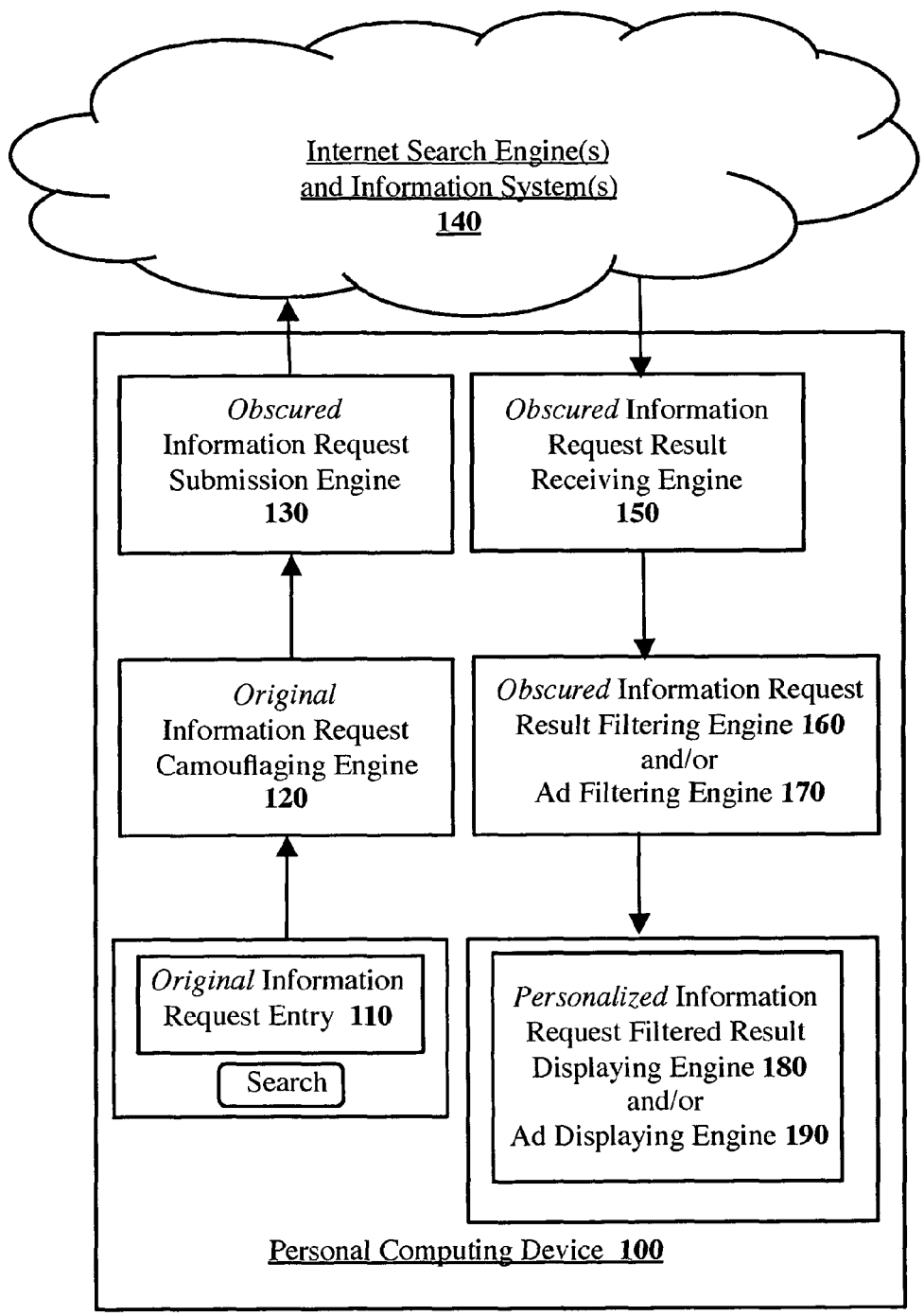
FIG. 1 shows an embodiment of a method, device and system according to the present invention. In this example 110, 120, 130, 150, 160, 170, 180 and/or 190 could resides on the personal computing device. However, in another example 110, 120, 130, 150, 160 and/or 170 could also reside on a remote computing device with which the personal computing device 100 is able to communicate.

The current invention involves a new group of computer agents to manage a user's information requests, the user's personal profiles, interests and preferences, and to apply such personal information when conducting Internet searches and other information requests, producing more relevant and personalized results. Such a system also allows advertisers to deliver more relevant advertisements to targeted users, while protecting user privacy on their personal profiles, interests and preference data. In addition, the same system can be applied to retrieving general digital information such as news or entertainment information requests or subscriptions, with tailored advertisements that do not violate their users' privacy.

The first application of the current invention is to improve the relevancy of search results from Internet searches. By allowing the user to control her personal profile, preferences and interests that she controls physically, the system applies such knowledge to her Internet search query by changing her query, so that commercial third party search engines only see generic and non-privacy-revealing query or search keywords, while the system restores the original query's specificity in a filtering step performed after the original query result arrives.

In addition, the system can apply the user's private information to make the result even more tailored to her individual needs.

The second application of the current invention is in advertising, where paradoxically we love to get the information that we want, but we hate being targeted for unwanted or undesirable advertisements. The current invention gives controls back to the users, who can determine which specific advertisements to be allowed; they can simply turn off specific advertisements and prevent the same or similar ones from being presented to them in the future. In addition, even though the system is aware of the user's personal profile, interests and preferences, such awareness is tightly controlled directly by the user on a physical device that is under the user's control; the information is never shared with any online third party entity, so there is no leakage of personal information. The result is the best of both worlds: the users can enjoy a positive experience with fewer but more useful advertisements in a permission-based advertising process without losing their privacy and personal data.

A third application is for news and information to be delivered tailored to each recipient's interests or personal profiles. One embodiment of the current invention deploys a personalization manager on a personal computing device, whether it is a virtual or physical device, where the user can specify her personal profile, preferences and interests together with categories of advertisements that she is interested in. The requested information is delivered with advertisements, which can be managed by the personalized advertising mechanism in the current invention so both the information and advertisements can be customized to the user's needs without the loss of privacy and personal data.

Several new concepts are involved in the current invention. First, this invention keeps all personal and privacy data on a personal computing device that the user physically controls, to eliminate the loss of such privacy to any third party service provider on the Internet or other network. Another embodiment expands the scope with several components of the current invention in a cluster called "virtual personal computing device" which can be implemented on one or more physical devices (and in one particular embodiment all such components are implemented on one single website) accessed remotely by the user. Whether physical or virtual, the device is controlled by the user, and not any third party search engine or information provider, to prevent any leakage of privacy data.

Second, this invention processes information requests in several steps, and only allows a third party service provider (such as Internet search engines, news information providers, etc.) to see a sanitized, or "obscured," version of the information query or request.

Third, upon obtaining the result based on such a sanitized query or request from a third party information provider, the system restores the original query's specificity by applying a filter based on the removed or modified portion of the original query to the immediate result from the third party information provider. For the user who is not aware of the internal processes, the search result should appear to be normal, consistent with the level of specificity of her original query or request.

Fourth, because the system manages the user's personal profile, preferences and interests, it can apply these additional factors to the information result, producing a much more tailored information result without revealing privacy information to any third party information provider.

Fifth, by extending the privacy protection to advertisement management, the current invention can help the user filter out unwanted advertisements. In addition, the invention allows each user to explicitly stop specific advertisements, or categories of advertisements, from appearing on her personal computing device or her designated display unit in the future. Also, the user can directly modify her personal preferences and interests any time, changing what kind of advertisements would be allowed to be displayed, thus achieving a highly personalized advertising result without losing control over her privacy data.

In FIG. 1, a Personal Computing Device 100, may be a personal computer (PC), a personal digital assistant (PDA), a mobile phone, or a digital device with a display and an method for user inputs. This Personal Computing Device is physically controlled by an intended user. When the user enters a search query looking for information, the query is captured and managed by an Original Search Query Entry Engine 110. Next, the query is analyzed and modified, if necessary, by an Original Search Query Camouflaging Engine (Camouflaging Engine) 120.

If the Camouflaging Engine 120 detects privacy revealing keywords or phrases, or through its analysis determines certain privacy information can be inferred from the original query, the Camouflaging Engine 120 takes one or more steps to protect the user's privacy. One strategy is to remove or replace an offending keyword or phrase in the original query. One way to accomplish this is to have a previously established reference list, against which a lookup operation can be performed to determine if a keyword or phrase is on the reference list. The same reference list can have a lookup table so an alternative keyword or phrase can be selected to replace the offending keyword or phrase. In some queries it may be easy to simply remove one or more keywords to make the original query less revealing from a personal privacy standpoint, for example, by removing "prostate" from the search "prostate cancer for older men." For other queries, it may be necessary to replace a keyword or phrase to camouflage the original query, such as replacing "erectile dysfunction" with "men's sexual problems" in the query "erectile dysfunction."

The Camouflaging Engine 120 can deploy other strategies to obscure the specificity of the original query. Using a "shotgun strategy," it can construct additional queries, each with different but related keywords, and forward all such "distracting queries" to the same third party information provider or search engine, such that if the search engine tries to analyze the user's intention, it will likely conclude that someone is researching a wider topic—such as "cancer," as opposed to the user's true intention of "prostate cancer stage II-A." Another "divide and conquer strategy" is, after analyzing the original query, the Camouflaging Engine 120 can break the original query into multiple parts and submit them as separate queries to separate information providers or search engines, such that each search engine only sees a portion of the full query and therefore cannot reason the user's intended purpose. Using this "divide and conquer strategy," the system needs to combine multiple results from different information sources, before processing the query results further—such a combination task is performed by the Obscured Search Query Result Receiving Engine 150.

When the Camouflaging Engine 120 makes any modification to the original query, it keeps track of the modifications and saves the modification history for later reference by other components, such as the Observed Query Search Result Filtering Engine (Filtering Engine) 160, which needs such information to restore the specificity of the original query, or the Ad Filtering Engine 170, which uses such information to filter out irrelevant advertisements.

Once the original query is analyzed and properly modified, if necessary, into an obscured search query, it is packaged and submitted to an outside information service provider or search engine on the Internet, by the Obscured Search Query Submission Engine (Query Submission Engine) 130. This Query Submission Engine 130 submits the query to one or more third party Internet Search Engine(s) or Information System(s) (Search Engine) 140, its functions including submitting multiple queries after an original query that is taken apart or transformed into multiple queries by the Camouflaging Engine 120 (when either a "shotgun" or "divide-or-concur" strategy is deployed).

When the search result from the obscured search query returns from the Search Engine 140 to the Personal Computing Device 100, the search result is first processed by an Obscured Search Query Result Receiving Engine (Receiving Engine) 150. If the Camouflaging Engine 120 uses either the shotgun or divide-and-conquer strategy, this Receiving Engine 150 must assemble the results in one of two ways. With the shotgun strategy, the Camouflaging Engine 120 fabricates additional queries not intended by the user to distract the Search Engine 140, thus obscuring the true intention of the user's query. Here, it is the Receiving Engine 150's function to identify and discard the results corresponding to such fabricated queries, allowing only the result from the query intended by the user to come through. With the divide-and-conquer strategy, the original query is divided into multiple sub-queries, each submitted to a different Search Engine 140, so no single Search Engine can see the complete intention of the user. Here, the Receiving Engine will need to assemble all such results from multiple Search Engines 140 into a superset containing all the results.

The search query result is then handed to an Observed Query Search Result Filtering Engine (Filtering Engine) 160. This Filtering Engine 160 restores the original query's specificity by applying the original keywords and phrases, which have been modified, replaced, or removed by the Camouflaging Engine 120, to the incoming search query result. Following the previous example, the Filtering Engine 160 would re-apply the previously removed keywords "prostate" and "stage II-A" to the incoming search result which was based on the modified query of just a single keyword "cancer," producing a query result as originally intended without giving any hint to a third party Search Engine that the user is searching for stage II-A prostate cancer information. The filtering process in the current invention deploys the inspection and selection process that many existing search engines use, which involves inspecting text and meta-text in an incoming stream of information, while applying a keyword or phrase matching process to selectively choose certain information elements based on the matching of the keywords or phrases. In the immediate example, the Filtering Engine 160 inspects incoming query result, while applying the matching process, looking for just text or meta-text containing the keywords "prostate" and "stage" and "II-A" (with more semantic reasoning the system can further determine that the user intends "prostate cancer" to be a phrase, and "stage II-A" should be another phrase). Only information entries from the original query result that match these keywords or phrases will be selected to be presented to the user (ranking the entries based on how closely they match the keywords or phrases is another common technique).

Beyond just restoring the original query's specificity, because the user's personal profile, preferences and interests are also kept locally on the Personal Computing Device 100 under the user's control, the Filtering Engine 160 can further apply the user's personal profile, preferences and interests to the search result, creating a final result that is far more personalized to the user's personal needs than any existing search engine could. In the previous example, the Filtering Engine 160 may know the user to be a cancer researcher who prefers certain information sources (such as academic .edu sites, government .gov sites, and nonprofit .org sites) and can assign higher ranking scores to result pages from such sites. If the Filtering Engine 160 knows the user was trained at Stanford University and is employed by M. D. Anderson Cancer Center, and that she strongly prefers information from National Cancer Institute and National Institute of Health, then result pages from all four institutes' websites will be given even higher ranking scores.

When there are advertisements associated with the search result of a query, the advertisements are also processed similarly by an Ad Filtering Engine 170 to produce the final list of personalized and filtered advertisements. The Ad Filtering Engine 170 works similarly to the Filtering Engine 160, restoring the original query's specificity by applying the original keywords and phrases, which have been modified, replaced, or removed by the Camouflaging Engine 120, to the incoming advertisements that may accompany a search query result or may come directly from a third party that places such advertisements. Furthermore, because the user's personal profile, preferences and interests are also kept locally on the Personal Computing Device 100 under the user's control, the Ad Filtering Engine 170 can further apply the user's personal profile, preferences and interests to the advertisements, creating personalized advertisements tailored to the user's needs. In the previous example, with the result of a search keyword "cancer," the original list of advertisements may contain many irrelevant entries for our user's needs. After the Ad Filtering Engine 170 restores the specificity of the original query by filtering out advertisements that have nothing to do with prostate cancer, it can apply its knowledge of the user's needs and preferences to finally present several advertisements about prostate cancer academic journals, conferences, prostate cancer drugs and related medical devices. With more detailed knowledge and preference-setting, the user can direct the system to give advertisements about local seminars and conferences higher scores so such entries will be presented near the top of the list.

The final search result is then displayed by a Personalized Search Query Filtered Result Displaying Engine 180 on the display component of the Personal Computing Device 100 or on another display unit as the user may desire. Associated advertisements, if any, are similarly processed and displayed by an Ad Displaying Engine 190. The functions of the Ad Filtering Engine 170 and Ad Display Engine 190 will be further discussed along with components of FIG. 2.

The same process in FIG. 1 can also serve information subscription requests, for example, after the user clicks on a long list of potentially interesting topics to the user's liking. The personal information may also include user-supplied keywords of interest, to allow the information provider (for example, a general news service provider) to tailor daily news delivery to the user's interest. Note the same process also works for signing up real-time information feeds such as RSS. Instead of feeding the user-supplied data directly to the service provider (which, would cause a great deal of loss of personal privacy data), the current invention would go through the same process in FIG. 1 to provide a more personalized news service without the loss of personal data to a third party. The original user's specifications (news categories and keywords of interest) will be analyzed by the Camouflaging Engine 120 to determine if one or more categories need to be replaced by less revealing and more general categories—for example, using "politics" to replace "green peace Democrats." Similarly, keywords that are reveal too much privacy are removed, replaced or "obscured" just as in previous example of processing search keywords. After the information request is sent to an outside third party (Information System 140), the Obscured Search Query Result Receiving Engine 150 may need to re-assemble the result if the Camouflaging Engine 120 has used either a "shotgun" or "divide-and conquer" strategy to camouflage the original information request. Next, it's up to the Result Filtering Engine 160 to restore the original information request's specificity by sifting through the incoming data while apply the original filter as specified by the user (in this embodiment, the user's categories of personal interests, plus keywords of interest) to narrow the output from this step. In addition, because the Result Filtering Engine 160 can access the user's personal profile, preferences and interests, it can further apply the most private knowledge about the user (for example, that the user is a single female in her 40's, making more than $100,000 a year as a cancer doctor and researcher at a major teaching hospital, living in San Francisco and working in Palo Alto, and enjoying movies, fine dining—but not steaks, international traveling, digital photography, and fine jewelry by specific designer names). The result is a far more tailored news information than what's available on the market, without the need to share any privacy data with the news or information provider. Just as in the previous example, the Ad Filtering Engine 170 also filters out unwanted or uninteresting advertisements, based on the user's original information request AND her personal profile, preferences and interests.

Figure 2:
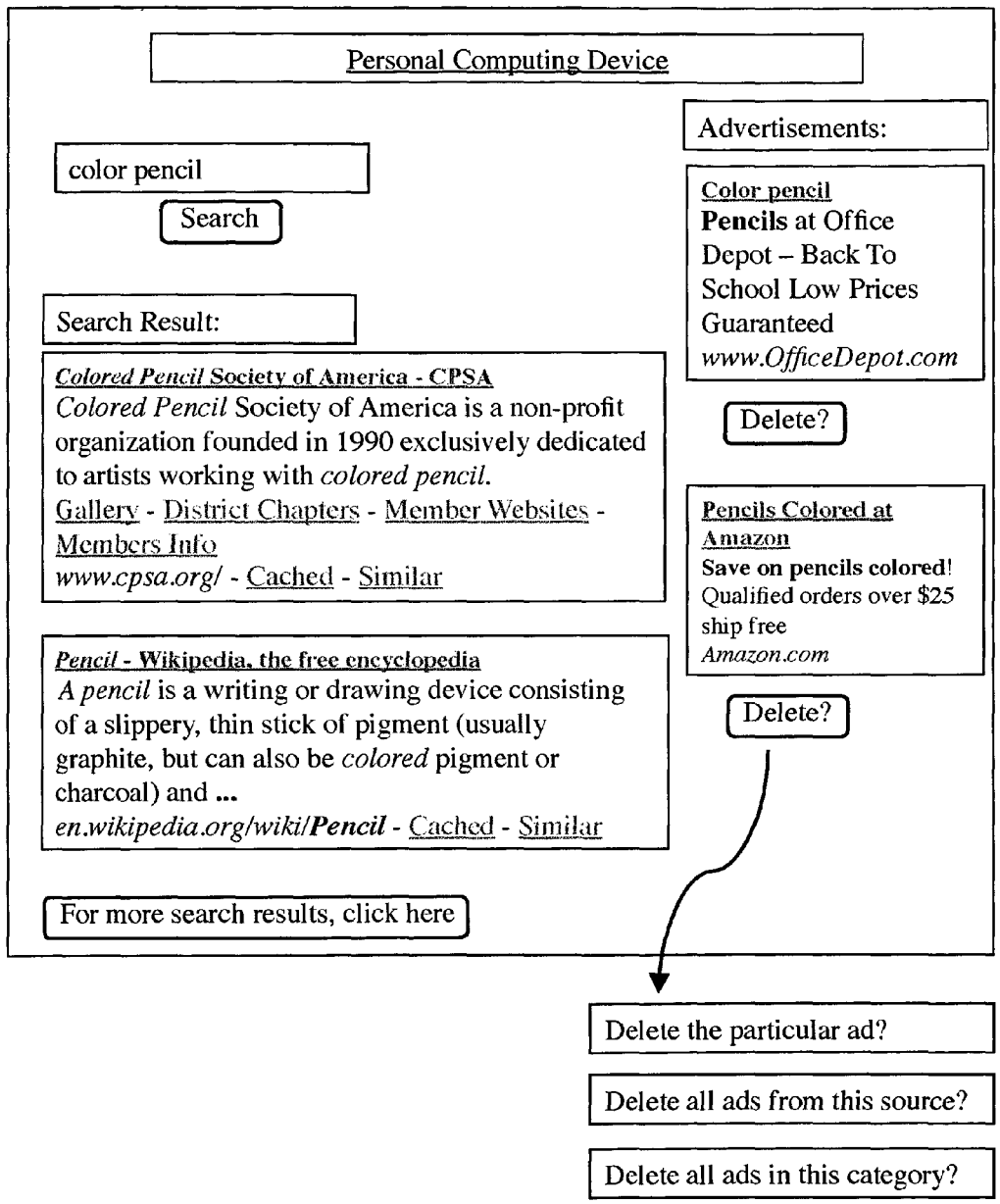
FIG. 2 shows an exemplary embodiment according to the present invention.

In FIG. 2, a display screen of a typical Personal Computing Device is depicted, with several components shown. On the top left corner, the phrase "color pencil" is shown in a box to illustrate a user's search keywords. The "Search" box below the search keywords illustrates a button that the user can click on with her mouse or another pointing device to activate the search process. The two large boxes below the search box illustrate the first two entries of the search result. In FIG. 2, based on the user's personal profile (for example, as a third grade school teacher) and her preference for information from academic (.edu sites), nonprofit organizations (.org sites) and a strong preference for materials from Wikipedia, the search query result is filtered to produce the top two references for her.

Also in FIG. 2, the advertisements on the right hand side illustrate two examples of targeted advertising. The two advertisements come directly from the third party search engine that was used to produce the original search result, with a "Delete?" button just below each advertisement. If the user clicks on the "Delete?" button, she will be given a number of choices as illustrated at the bottom of FIG. 2, where the user is asked whether she wants to delete the specific ad only, or delete all ads from the particular advertiser (the source), or delete all ads in the particular category (pencils colored, as described by Amazon in this example). Once the user makes her choice, the system will execute her decision and the display will be refreshed by the Ad Displaying Engine 190 described in FIG. 1, reflecting the removal of related advertisements of her choice. The user's preferences of what advertisements to be blocked are also updated by the Ad Filtering Engine 170 described in FIG. 1.

When the user input is an information subscription (instead of a search query), the advertisement management process as described in FIG. 2 still works the same way. While a majority of the screen may be taken up by news articles (if the information subscription is news subscription; not shown in FIG. 2), the advertisements that have been filtered by the Ad Filtering Engine 170 in FIG. 1 are illustrated in FIG. 2 with a "Delete?" button underneath each advertisement. Just the same as in the previous Search query example, the user can decide to remove a particular advertisement or a category of advertisements by clicking on the "Delete?" button and choosing one of the appropriate actions.

To support the current invention beyond a single personal device, personal storage devices such as USB drives and memory cards can be loaded with one or more components of the current invention, creating a virtual Personal Computing Device 100 on such storage devices, allowing the users to enjoy the same experience on shared computing devices they do not own or control in locations such as hotel rooms, airports, and internet cafes. As long as the user maintains control over such a personal storage device, she can effectively prevent the loss of privacy data to third party information providers or search engines.

As mentioned in figure legend for FIG. 1, a variation of the invention is a system where the user can control her privacy environment remotely, based on the components described in this invention, but in a central location, so that she can manage several, or all, of her computing devices in a consistent manner. In such system embodiment, the user can maintain effective control, even if not a physical control, over the privacy environment. For example, a website can be established to implement all the components of the current invention, and such a website—"Master Website"—may be effectively controlled by the user without concerns over potential loss of privacy data. In this example, all internet searches and information requests are routed to, and managed by the components on this Master Website. Such an effective control over the environment and components on the Master Website can be equivalent to the physical control suggested above, in order to maintain adequate privacy control.

The invention claimed is:

1. A method for performing private information requests on a personal computing device, comprising:
   a) entering an original information request on said personal computing device, wherein said original information request is a search query for information available over the Internet containing a plurality of readable words;
   b) a camouflaging engine operated on and by said personal computing device changing said search query and producing a sanitized search query by removing or replacing one or more readable words from said search query when said one or more readable words matches a word in a list of pre-defined readable words, and wherein said replacing involves replacing said one or more readable words with a readable word from a lookup table;
   c) an information request submission engine operated by and on said personal computing device submitting said set of readable words of said sanitized search query to an Internet accessible search engine;
   d) said Internet accessible search engine operated by a computer system generating a search result, wherein said search result is the computer system generated result of applying said sanitized search query to said Internet accessible search engine;
   e) a receiving engine operated by and on said personal computing device receiving said search result from said Internet accessible search engine;
   f) a filtering engine operated by and on said personal computing device filtering said search result, wherein said filtering engine filters said search results based on said original information request to then obtain a filtered search result for said original information request; and
   g) displaying said filtered search result for said original information request on said personal computing device.

2. The method of claim 1, further comprising receiving one or more advertisements from said search engine or receiving one or more advertisements from a third advertisement party or an outside advertisement party.

3. The method of claim 1, further comprising:
   a) said receiving engine receiving one or more advertisements,
   b) an advertisement filtering engine filtering said received advertisements; and
   c) displaying said filtered advertisements on said personal computing device.

4. The method of claim 3, wherein said advertisement filtering is performed based on said original information request, said stored preferences and personal profile of the user of said personal computing device, or any combination thereof.

5. The method of claim 3, further comprising the step of allowing the user of said personal computing device to delete one or more advertisements from the current or any future display.

6. The method of claim 5, further comprising listing information pertaining to said deleted advertisements in said stored preferences and personal profile of the user of said personal computing device.

* * * * *